(12) United States Patent
Katayama et al.

(10) Patent No.: US 8,755,760 B2
(45) Date of Patent: *Jun. 17, 2014

(54) RADIO RECEIVER, RADIO COMMUNICATION SYSTEM, RADIO COMMUNICATION METHOD, AND PROGRAM

(75) Inventors: Yasunao Katayama, Kanagawa (JP); Daiju Nakano, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,388

(22) Filed: Sep. 13, 2012

(65) Prior Publication Data

US 2013/0010902 A1    Jan. 10, 2013

Related U.S. Application Data

(63) Continuation of application No. 12/947,974, filed on Nov. 17, 2010, now Pat. No. 8,391,815.

(30) Foreign Application Priority Data

Nov. 27, 2009    (JP) ................................. 2009-269606

(51) Int. Cl.
*H04B 1/04*    (2006.01)

(52) U.S. Cl.
USPC .......... 455/130; 455/39; 455/131; 455/190.1; 455/207; 375/316; 375/349; 375/350

(58) Field of Classification Search
USPC ........ 455/130, 131, 190.1, 207, 139, 323, 39; 375/316, 349, 350
See application file for complete search history.

(56) References Cited

U.S. PATENT DOCUMENTS

| | | | | |
|---|---|---|---|---|
| 5,419,180 A | * | 5/1995 | Yamada et al. | 73/35.05 |
| 7,956,495 B2 | * | 6/2011 | Jin | 307/104 |
| 8,391,815 B2 | * | 3/2013 | Katayama et al. | 455/130 |
| 2007/0085510 A1 | * | 4/2007 | Asada | 322/28 |

FOREIGN PATENT DOCUMENTS

| | | |
|---|---|---|
| JP | 5327356 A | 12/1993 |
| JP | 2001-103044 | 4/2001 |
| JP | 2001156866 | 6/2001 |
| JP | 2003-218967 | 7/2003 |
| JP | 2003198427 | 7/2003 |
| JP | 2003-234791 | 8/2003 |
| JP | 2007-181016 | 7/2007 |
| JP | 2007243622 | 9/2007 |

* cited by examiner

*Primary Examiner* — Tuan Pham
(74) *Attorney, Agent, or Firm* — Tutunjian & Bitetto, P.C.

(57) ABSTRACT

A radio receiver including a sampling unit, a provider, an arithmetic operation unit, an estimator, and a converter. The sampling unit samples a baseband signal transmitted from the radio transmitter, at a fractional multiple of a symbol rate, and generates fractional-multiple-sampling data. The provider provides reference data in which the known symbol sequence arranged in a frame by the radio transmitter is interpolated at a rate of the fractional multiple. The arithmetic operation unit performs an arithmetic operation for evaluation data in which the degree of consistency in waveform between the fractional-multiple-sampling data and the reference data is evaluated. The estimator estimates a reference timing from a shift amount at which the evaluation data shows the maximum degree of consistency in waveform. The converter converts the fractional-multiple-sampling data by using the reference timing as a reference thereby recovering the data having the symbol rate.

4 Claims, 6 Drawing Sheets

RADIO RECEIVER, RADIO COMMUNICATION SYSTEM, RADIO COMMUNICATION METHOD, AND PROGRAM

CROSS REFERENCE TO RELATED APPLICATION

This application is a continuation of co-pending application Ser. No. 12/947,974 filed on Nov. 17, 2010, incorporated herein in its entirety, which also claims priority under 35 U.S.C. 119 from Japanese Application 2009-269606, filed Nov. 27, 2009, the entire contents of which are also incorporated herein by reference.

BACKGROUND OF THE INVENTION

1. Field of the Invention

The present invention relates to a radio communication technology, and more specifically, relates to a radio receiver, a radio communication system, a radio communication method, and a program which achieve synchronization in high-speed radio communications.

2. Description of Related Art

Recently, communication rates in information communications have been increasing. Higher communication rates have also been increasingly demanded in radio communications in order to achieve real-time transmission/reception of rich content, such as a moving images and seamless connections to wired communications. In information communications, it is indispensable to synchronize signals between a transmitting side and a receiving side in order to correctly achieve data transmission/reception. However, in radio communications, a clock signal is not transmitted independently on the transmitting side, and a synchronization clock is generated on the receiving side. Thus, phase synchronization between the transmitting side and the receiving side is a challenging task, with the overall performance of a radio communication system depending on the quality of the synchronization.

A known technique for data synchronization in radio communications is to use a known pattern sequence. In this technique, a transmitter transmits a signal of a known pattern sequence to a receiver, the known pattern sequence being arranged in the preamble or the header of a frame. The receiver calculates a correlation between the received signal and a signal of the known pattern sequence or performs an arithmetic operation for pattern matching therebetween, and thereby detects the known pattern sequence in the received signal. In this way, symbol synchronization between the transmitter and the receiver is achieved.

For example, Japanese Patent Application Publication No. 2001-103044 (Patent Literature 1) discloses a symbol synchronization method in which a receiver oversamples a received signal at a rate of N times per symbol, and then calculates a correlation between the oversampled signal and a known symbol sequence. In the symbol synchronization method, a certain sampling point is selected and used as a symbol timing. Specifically, the certain sampling point is a sampling point existing foremost among sampling points which are near a sampling point having the maximum amplitude of a calculated correlation function and which concurrently have amplitudes equal to or higher than a predetermined threshold.

Japanese Patent Application Publication No. 2003-218967 (Patent Literature 2) discloses a timing synchronization method in which a synchronization timing point is obtained by: oversampling a received frame including multiple synchronization symbols; and then by calculating a correlation between the multiple digitized synchronization symbols and a reference symbol for timing synchronization which has been set in advance.

Japanese Patent Application Publication No. 2003-234791 (Patent Literature 3) discloses a detection method of finding a symbol timing by performing an arithmetic operation for a delay detection of an input baseband signal oversampled by N times.

Japanese Patent Application Publication No. 2007-181016 (Patent Literature 4) discloses a configuration of sampling signals at a frequency which is an integer multiple of a symbol modulation rate.

As described above, in each of the synchronization techniques using a known pattern sequence, a signal is sampled at a higher rate than a symbol rate, and then a known pattern sequence is detected from the oversampled data. Normally, as disclosed in the aforementioned Patent Literatures 1 to 4, the signal is oversampled at a rate which is an integer multiple of a symbol rate, more typically at a rate $2^N$ times (N is an integer) as high as the symbol rate. Therefore, the known pattern sequence is formed of an integer number of bits. Thus, whichever technique of the correlation calculation or pattern matching is used, detection is generally difficult unless the oversampling rate is set as an integer multiple to correspond to the integer number of bits.

In a region in which a relatively low symbol rate is used, the oversampling at a rate of an integer multiple, such as 8, 16, 100, or 128 times, can be performed readily even in radio communications. However, in a region in which a data rate exceeding 1 Gbps is used, the bandwidth of the signal and the bandwidth of the circuit are close to each other. Thus oversampling at a rate of an integer multiple is difficult.

As an analog to digital converter (ADC) used for oversampling, even high-end ADC's currently available on the market have a performance of approximately 4 Gsps. Accordingly, when a data rate of 3 Gbps is assumed, a commercially available ADC cannot achieve oversampling at even two times, which is the smallest integer multiple. There do exist ADC's for measuring equipment capable of a performance of up to 50 Gsps, however, from a viewpoint of cost, they are prohibitively expensive for a consumer communication apparatus. In summation, with the increasing rate of data in recent radio communications, the oversampling at an integer multiple of a symbol rate has become difficult, and thus synchronization has become very difficult.

As described above, in the aforementioned conventional techniques disclosed in Patent Literatures 1 to 4, oversampling at an integer multiple is performed in one symbol frequency, and a circuit thereof is configured also based on the integer multiple. In a case where any of the conventional techniques disclosed in Patent Literatures 1 to 4 is applied to achieve radio communications at a data rate of 3 Gbps by using an ADC having a sampling rate of approximately 4 Gsps, there arises a need for an extra conversion process in which upsampling or interpolation is performed before calculating a correlation value, and then a signal having a rate of an integer multiple is generated. This causes an additional error due to the upsampling or the interpolation. In addition, when the correlation calculation or the arithmetic operation of pattern matching is performed, oversampling at a rate of even two times, which is the smallest integer multiple, requires a register two times as long as the known pattern sequence. Consequently, this leads to a largely configured circuit and an increase of power consumption.

BRIEF SUMMARY OF THE INVENTION

To overcome these deficiencies, the present invention provides a radio receiver configured to communicate with a radio transmitter which transmits data with a known symbol sequence arranged in a frame, the radio receiver including: a sampling unit for sampling a baseband signal transmitted from the radio transmitter at a fractional multiple of a symbol rate, wherein fractional-multiple-sampling data is generated, a provider for providing reference data in which the known symbol sequence is interpolated at a rate of the fractional multiple, wherein the interpolation reflects an overall filter characteristic of the radio transmitter and the radio receiver, an arithmetic operation unit for performing an arithmetic operation for evaluation data in which the degree of consistency in waveform between the fractional-multiple-sampling data and the reference data is evaluated, an estimator for estimating a reference timing from a shift amount at which the evaluation data shows a maximum degree of consistency in waveform, and a converter for converting the fractional-multiple-sampling data by using the reference timing as a reference wherein the frame having the symbol rate is recovered.

According to another aspect of the invention, the present invention provides a radio communication system including a radio transmitter which transmits data with a known symbol sequence arranged in a frame and a radio receiver which communicates with the radio transmitter, the radio receiver including: a sampling unit for sampling a baseband signal transmitted from the radio transmitter at a fractional multiple of a symbol rate, wherein fractional-multiple-sampling data is generated, a provider for providing reference data in which the known symbol sequence is interpolated at a rate of the fractional multiple, wherein the interpolation reflects an overall filter characteristic of the radio transmitter and the radio receiver, an arithmetic operation unit for performing an arithmetic operation for evaluation data in which the degree of consistency in waveform between the fractional-multiple-sampling data and the reference data is evaluated, an estimator for estimating a reference timing from a shift amount at which the evaluation data shows a maximum degree of consistency in waveform, and a converter for converting the fractional-multiple-sampling data by using the reference timing as a reference wherein the frame having the symbol rate is recovered.

According to yet another aspect of the invention, the invention provides a method which is executed by a radio receiver configured to communicate with a radio transmitter which transmits data with a known symbol sequence arranged in a frame, the method including the steps of sampling a baseband signal transmitted from the radio transmitter at a fractional multiple of a symbol rate, wherein fractional-multiple-sampling data is generated, performing an arithmetic operation for evaluation data in which the degree of consistency in waveform between the fractional-multiple-sampling data and reference data is evaluated, the reference data being obtained by interpolating the known symbol sequence at the rate of the fractional multiple, wherein the interpolation reflects an overall filter characteristic of the radio transmitter and the radio receiver, estimating a reference timing from a shift amount at which the evaluation data shows a maximum degree of consistency in waveform, and converting the fractional-multiple-sampling data by using the reference timing as a reference wherein the frame having the symbol rate is recovered.

DETAILED DESCRIPTION OF THE PREFERRED EMBODIMENTS

The present invention will be described by using specific embodiments. However, the present invention is not limited only to the embodiments that are described.

Figure 1:
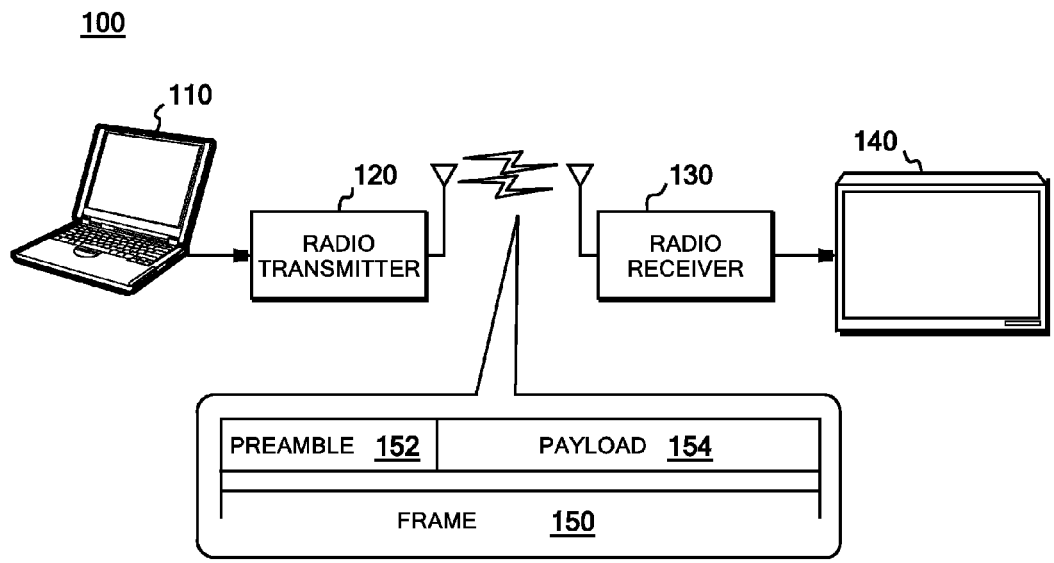
FIG. 1 is a schematic diagram showing a radio communication system according to an embodiment of the present invention.

FIG. 1 is a schematic diagram showing a radio communication system 100 according to an embodiment of the present invention. The radio communication system 100 of the embodiment includes a radio transmitter 120 and a radio receiver 130. The radio transmitter 120 and the radio receiver 130 establish radio communication using an electromagnetic wave of a frequency band of, for example, several tens of GHz, and achieve a data communication rate of several Gbps.

Generally, in order to perform data communication correctly, synchronization between a transmitter and a receiver is required. The radio transmitter 120 and the radio receiver 130 of this embodiment achieve symbol synchronization by using a known symbol sequence defined commonly between the radio transmitter 120 and the radio receiver 130. The radio transmitter 120 arranges data of a known symbol sequence in a preamble 152 in a frame 150, and then transmits the data to the radio receiver 130. On the other hand, the radio receiver 130 of this embodiment checks the received data with reference data for detecting the known symbol sequence (details will be described later), and thereby detects the known symbol sequence in a transmission data signal from the radio transmitter 120. The radio receiver 130 estimates a reference timing of the known symbol sequence, thereby recovers the frame 150 including a payload 154 which is substantial data.

Thereby, the radio receiver 130 performs synchronization of symbol timing with sufficient accuracy and thus correct data transmission is achieved.

Any sequence can be used as the aforementioned known symbol sequence in this embodiment using a correlation calculation, as long as the sequence has a high autocorrelation. Examples thereof include a maximal-length sequence (M sequence), a Gold sequence, a Golay sequence, and the like, which are pseudo-random number sequences. Note that "having a high autocorrelation" means "having a characteristic in which a single peak is observed in an autocorrelation function," preferably "having a characteristic in which side lobes gradually approximate substantially zero." The high autocorrelation of the known symbol sequence enables favorable estimations of the start position of the known symbol sequence and a sampling phase.

In an example shown in FIG. 1, a laptop personal computer 110, for example, is connected to the radio transmitter 120, while a display 140, for example, is connected to the radio receiver 130. For example, the content of the data, such as, a moving image loaded on the payload 154 of the frame 150, is transferred from the laptop personal computer 110 via the radio transmitter 120 and the radio receiver 130, and then is displayed on a screen of the display 140.

Figure 2:
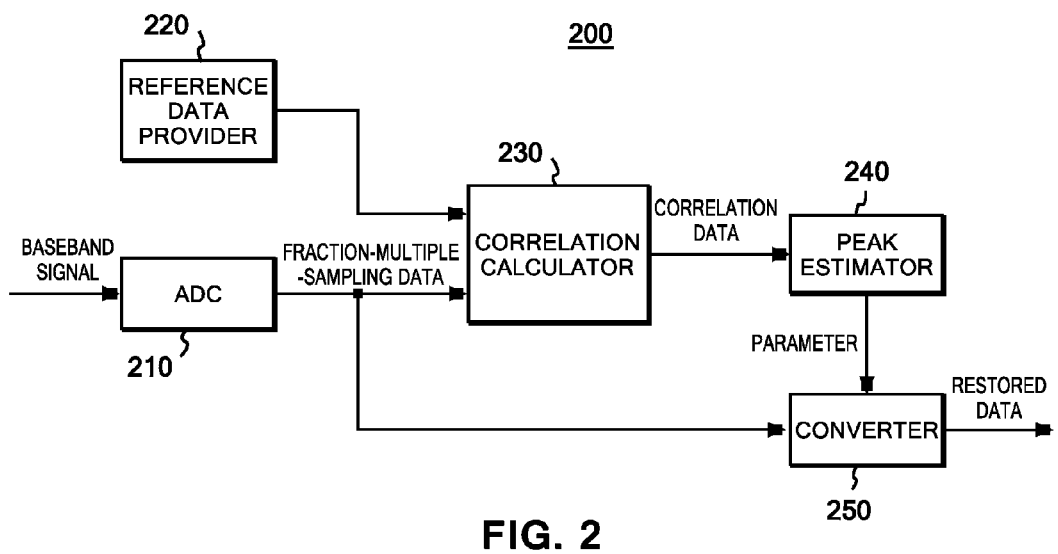
FIG. 2 is a functional block diagram of a radio receiver of this embodiment.

Herein below, symbol synchronization using reference data is described in more detail. FIG. 2 shows a functional block diagram of the radio receiver 130 of this embodiment. A functional block 200 of the radio receiver 130 includes an analog to digital converter (ADC) 210, a reference data provider 220, a correlation calculator 230, a peak estimator 240, and a converter 250. Note that the functional block 200 shown in FIG. 2 shows only a functional configuration related to the symbol synchronization, and other functional elements are omitted, such as an antenna, a radio frequency (RF) signal processor which processes radio wave signals, as well as processors for a media access control (MAC) layer and the subsequent layers, where recovered data is processed with predetermined protocols.

The ADC 210 receives a baseband signal (I phase/Q phase) transmitted from the radio transmitter 120 via the antenna and RF signal processor (not illustrated). The baseband signal to be inputted into the ADC 210 is an analog signal which is obtained by limiting a band of a transmitted baseband signal of a modulation signal having a predetermined symbol rate due to a filter characteristic of the radio transmitter 120 and the radio receiver 130. Hereinafter, the baseband signal inputted to the ADC 210 is referred to as an input baseband signal.

The ADC 210 oversamples the input baseband signal at a rate which is a fractional multiple (q/p times, where p and q are prime positive integers) of the above-described symbol rate, and then generates fractional-multiple-sampling data. The generated fractional-multiple-sampling data is outputted from the ADC 210, and then inputted into the correlation calculator 230 and the converter 250. Note that the ADC 210 provides a sampling unit of this embodiment.

The correlation calculator 230 performs a correlation calculation on reference data inputted from the reference data provider 220 by directly using the fractional-multiple-sampling data inputted from the ADC 210, generates correlation data which is a function of a shift amount of a correlation value, and outputs the correlation data to the peak estimator 240. The correlation calculator 230 provides an arithmetic operation unit of this embodiment, and the correlation data provides evaluation data in which the degree of consistency in waveform between the reference data and the fractional-multiple-sampling data is evaluated. Although the details of the reference data will be described later, the reference data is data for detecting the known symbol sequence arranged in the preamble 152 of the frame 150 from the transmitting side, by performing the correlation calculation directly with the fractional-multiple-sampling data, and is provided by the reference data provider 220.

From a versatility viewpoint, the reference data provider 220 can be configured as follows. Specifically, the reference data provider 220 calculates the reference data beforehand from the known symbol sequence, stores the data as a table in a memory such as a read only memory (ROM), reads the data from the memory upon receipt of the baseband signal, and then provides the data as a correlation coefficient to the correlation calculator 230. In this case, even a change to a different known symbol sequence can be made by rewriting new reference data in the memory. Alternatively, when the known symbol sequence is fixed or semi-fixed, the reference data is hard-wired and internally configured to be implemented in the correlation calculator 230. This can improve the performance and reduce the circuit size. The hard-wired implementation might be preferable, depending on the oversampling rate and the length of the known symbol sequence. Note that the reference data provider 220 provides a provider of this embodiment.

The peak estimator 240 estimates a reference timing of the known symbol sequence from the inputted correlation data, and outputs the reference timing to the converter 250 as parameters such as a start position and a sampling phase. The converter 250 performs interpolation processing on the fractional-multiple-sampling data inputted from the ADC 210 in accordance with the reference timing (the start position and the sampling phase of the known symbol sequence) estimated by the peak estimator 240, recovers data which is synchronized in correct phases and has an original symbol rate, and then outputs the data to a MAC processor or the like provided for subsequent processing. The peak estimator 240 and the converter 250 provide an estimator and a converter of this embodiment, respectively.

Figure 3:
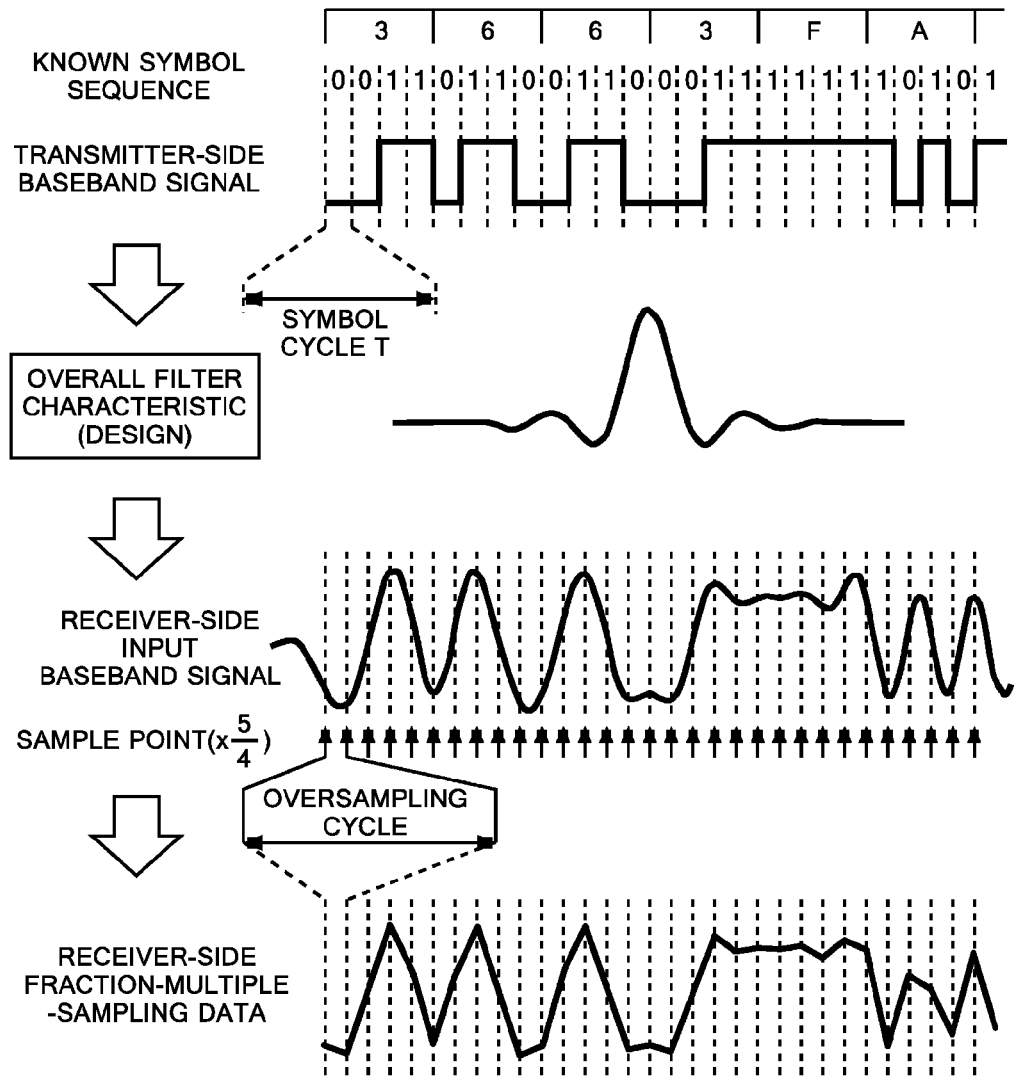
FIG. 3 is a diagram explaining a principle of symbol synchronization of this embodiment.
Figure 4:
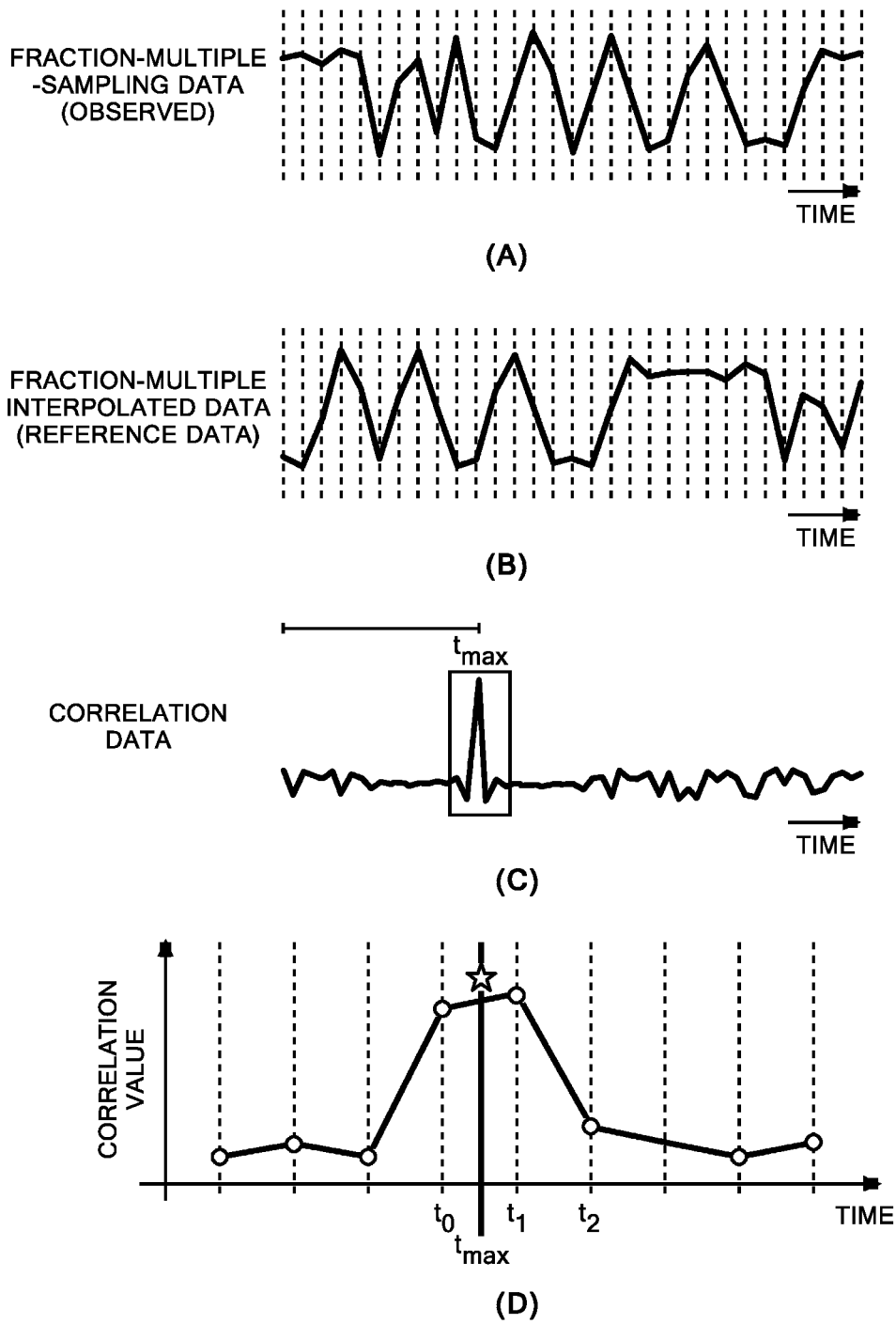
FIGS. 4A to 4D are graphs explaining a principle for obtaining a reference timing from reference data and fractional-multiple-sampling data of this embodiment.

Hereinbelow, an operation mechanism of the symbol synchronization using the reference data and the fractional-multiple-sampling data will be described in more detail by referring to FIGS. 3 to 6. FIG. 3 is a diagram explaining a principle of the symbol synchronization of this embodiment. Note that for the sake of convenience, the description is given in this embodiment by taking, as an example of a modulation method, a binary phase shift keying (BPSK) modulation which is a binary modulation. In addition, in the description below, a Golay sequence of 128 bits "3663FAAFFA50369CC99CFAAF05AF369C" is used as a known symbol sequence. However, the known symbol sequence and the length thereof are not limited to the exemplary ones, and can be set in consideration of the accuracy of detection and the overhead of communication.

As to a modulation method, this embodiment is also applicable to various modulation methods, for example, amplitude shift keying (ASK) and frequency shift keying (FSK), multi-level modulation methods such as multiple phase shift keying (MPSK), multiple frequency shift keying (MFSK), multiple amplitude shift keying (MASK), and quadrature amplitude modulation (QAM), and others. When the multilevel modulation method is adopted, what is needed is to configure an appropriate preamble so that a symbol sequence having a high autocorrelation can be obtained after performing mapping corresponding to the modulation method. Here, the symbol sequence is expressed by a complex function formed of an I phase and a Q phase.

The description below is given of the embodiment on the assumption that 5/4 times is selected as the oversampling rate.

The fractional-multiple rate is not particularly limited, but preferably takes on a value in a range of 1<(q/p)<2 from a viewpoint of effective utilization of the principle of the embodiment of the present invention and from a viewpoint of power consumption, and more preferably 1.2≤q/p from a viewpoint of a detection accuracy. In general, the larger an integer q is, the more preferable. Meanwhile, an integer p preferably takes on a small value in consideration of the arithmetic operational efficiency, power consumption, and complexity of an arithmetic operation in recovering the data having the symbol rate from the fractional-multiple-sampling data. To be more specific, fraction values of 3/2, 4/3, 5/3, 5/4, 7/4, 6/5, 7/5, 8/5, and 9/5 can be cited as examples of a favorable parameter, and 3/2, 4/3, and 5/3 are more preferable among the above.

Herein below, a description is given of how a baseband signal (transmitter-side baseband signal) having a symbol frequency T and corresponding to a known symbol sequence is observed on the radio receiver 130 side when the baseband signal is transmitted from the radio transmitter 120 to the radio receiver 130. In this case, an input baseband signal observed on the input side, or on the ADC 210 of the radio receiver 130 (a receiver-side input baseband signal), is a signal obtained by limiting the band of the transmitter-side baseband signal due to the filter characteristic of a radio transmitter and a radio receiver as the whole (hereinafter, referred to as an overall filter characteristic). For example, when the overall filter characteristic is expressed by a raised cosine filter, a time response h(t) can be expressed by the following equation (1). The time response is reflected in the receiver-side input baseband signal.

$$h(t) = \frac{\sin\left(\frac{\pi t}{T}\right)}{\frac{\pi t}{T}} \frac{\cos\left(\frac{\pi \beta t}{T}\right)}{1 - \frac{4\beta^2 t^2}{T^2}} \quad (1)$$

Figure 7:
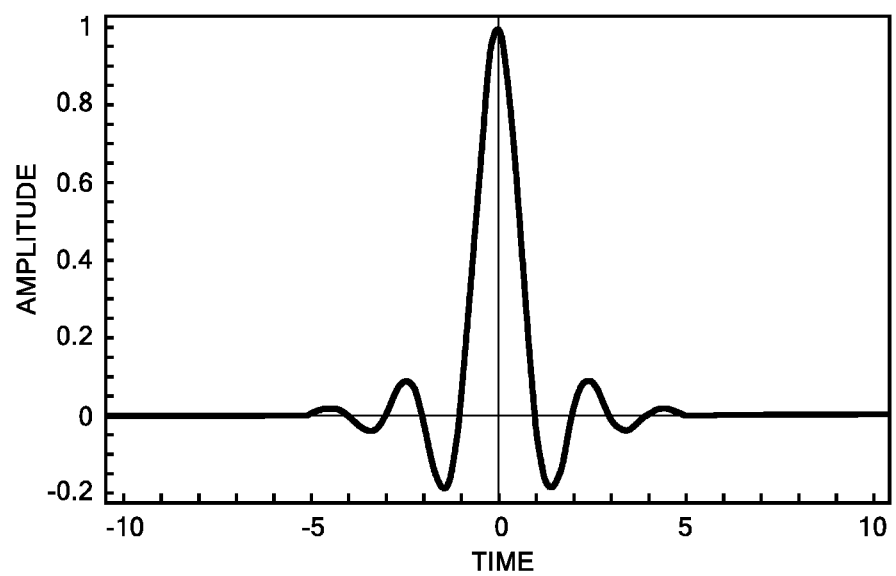
FIG. 7 is a graph showing a time response of a raised-cosine filter having a roll-off ratio $\beta$ of 0.25.

In the equation above, T denotes a symbol rate; β, a roll off ratio; and t, time. FIG. 7 is a graph showing a time response of a raised cosine filter having the roll off ratio β of 0.25. Note that the symbol rate T is 1 in FIG. 7.

Figure 8:
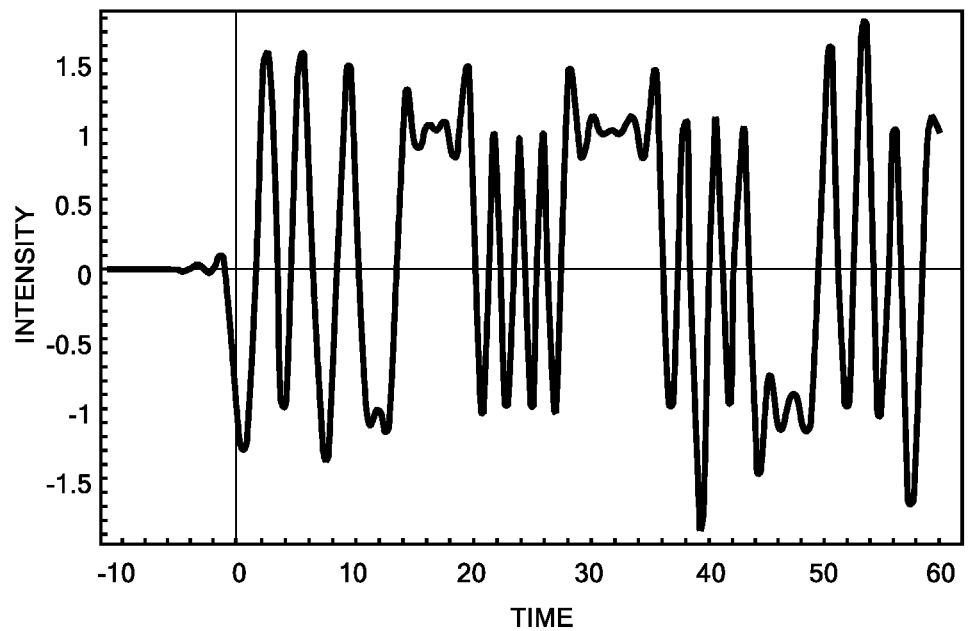
FIG. 8 is a graph showing a waveform of an input baseband signal which is observed on the ADC input side, the input baseband signal obtained by limiting a band of a transmitter-side baseband signal according to a raised-cosine filter characteristic in which the roll-off ratio $\beta$ is 0.25.
Figure 9:
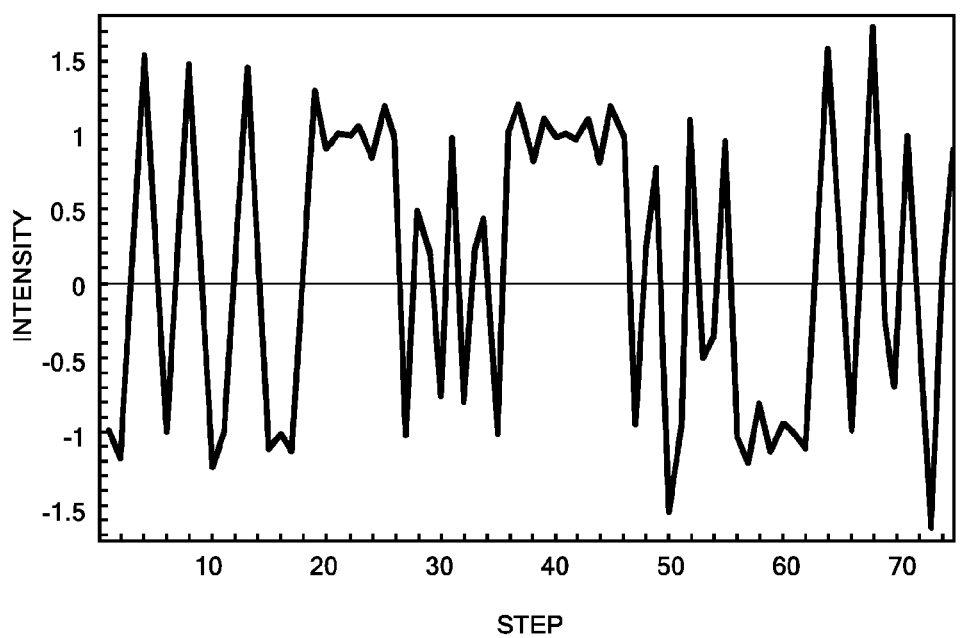
FIG. 9 is a graph showing a waveform of sampling data when an input baseband signal is sampled at a rate of 5/4 times.

On the radio receiver 130 side, the ADC 210 oversamples, at a rate of q/p times, the receiver-side input baseband signal obtained by limiting the band of the transmitter-side baseband signal, and then generates fractional-multiple-sampling data (receiver-side fractional-multiple-sampling data). FIG. 8 is a graph showing a waveform of the input baseband signal which is observed on the ADC input side. The input baseband signal is obtained by limiting the band of the transmitter-side baseband signal due to the raised cosine filter characteristic which uses the exemplified known symbol sequence and in which the roll off ratio β is 0.25. FIG. 9 is a graph showing a waveform of sampling data in a case of sampling the input baseband signal at the rate of 5/4 times.

In order to detect the known symbol sequence in the actual fractional-multiple-sampling data, certain data is calculated as the reference data in this embodiment, the certain data corresponding to a waveform obtained in the case where the band of the baseband signal of the predetermined known symbol sequence is band-limited due to the overall filter characteristic and the baseband signal is sampled at the fractional-multiple rate. Generally, the overall filter characteristic is known, since the filter characteristic is designed by dividing the functions to the radio transmitter side and the radio receiver side so that a desirable characteristic overall can be obtained.

In this embodiment, the description is given by taking as an example a case where the overall filter characteristic is designed as the raised cosine filter. The raised cosine filter, however, is merely an example. As long as the waveform of the overall filter characteristic is known, the filter shape of the characteristic is not limited. Any filter used in radio communication technology is conceivable, and for example, a Bessel filter, Chebyshev filer, a Butterworth filter, or a Gaussian filter can be used besides the raised cosine filter. A filtering function or an approximation thereof according to the filter characteristic can be defined.

When the overall filter characteristic is designed as the raised cosine filter, a filtering function shown in the above-described equation (1) expressing the raised cosine filter is used as an interpolation formula, and thereby the reference data is generated by interpolating the known symbol sequence at the rate of q/p times in the enlarged manner. To be more specific, a table is created by interpolating the signal of the known symbol sequence by an integer multiple (q times) by use of the filtering function, and then the signal is thinned out at intervals of the number of an integer (every p) in the table. Thereby, the reference data interpolated at the rate of q/p times in the enlarged manner can be obtained. The length of the reference data is approximately the known symbol sequence multiplied by the fractional multiple.

The above-described equation (1) can be directly used as an interpolation formula actually used for the enlarged interpolation. Alternatively, an approximation such as a polynomial approximation or the like of the above-described equation (1) may also be used. The polynomial approximation can secure sufficient accuracy even in a third-order polynomial, and can also reduce the arithmetic operational processing in the hard-wired implementation. Considering that the interpolation formula is used also in recovering the data having the symbol rate from the fractional-multiple-sampling data, it is preferable to use an interpolation formula using the polynomial approximation.

Consider the case of the polynomial approximation where an approximation function of the filtering function is F(t)= $at^3+bt^2+ct+d$. In this case, when a section between two central points in four specific points is interpolated, such coefficients a, b, c and d that allow the approximation function to always pass through the four specific points are obtained, and an appropriate interpolation ratio t is set. Thereby, an interpolation value can be obtained.

FIGS. 4A to 4D are graphs explaining the principle for obtaining the reference timing from the reference data and the fractional-multiple-sampling data of this embodiment. FIG. 4A schematically shows the fractional-multiple-sampling data inputted from the ADC 210 to the correlation calculator 230. FIG. 4B schematically shows the reference data inputted from the reference data provider 220 to the correlation calculator 230. The correlation calculator 230 calculates a cross-correlation value R (τ) between the reference data and the fractional-multiple-sampling data in accordance with the following equation (2), and then outputs the crosscorrelation value R (τ) to the peak estimator 240.

$$R(\tau) = \sum_{k=0}^{L} ref(k) \cdot smpl(k+\tau) \quad (2)$$

In the above-described equation (2), L denotes the length of the known symbol sequence obtained by multiplying the known symbol sequence by a fraction; ref(t), a t-th(t=0 to L) value of the reference data; smpl(t), a value of a t-th(t=0 to L) sampling point of the fractional-multiple-sampling data; and τ, a shift amount.

FIG. 4C schematically shows the correlation data calculated from: the reference data calculated from the known symbol sequence; and the observed fractional-multiple-sampling data. As shown in FIG. 4C, when the fractional-multiple-sampling data includes the known symbol sequence, a peak is observed in the correlation value, the peak having a shift amount approximately corresponding to the beginning of the known symbol sequence. Since a timing at which the peak is observed approximately corresponds to the beginning of the known symbol sequence, data can be recovered by using this timing as a reference. The peak can be determined, for example, as a point exceeding a threshold set in advance.

Figure 10:
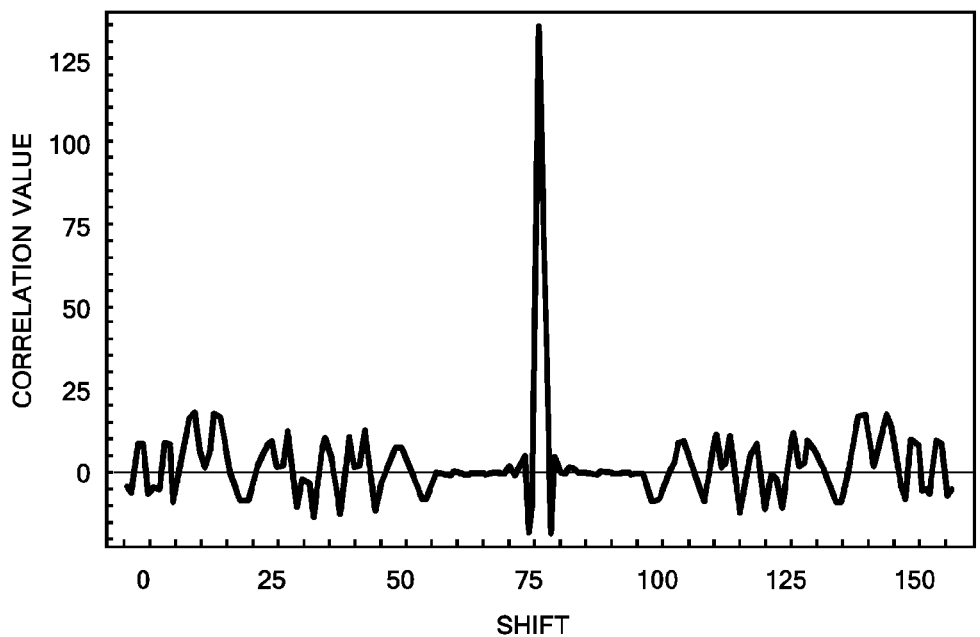
FIG. 10 is a graph showing correlation data calculated based on the fractional-multiple-sampling data and the reference data.

FIG. 10 is a graph showing correlation data calculated from the fractional-multiple-sampling data shown in FIG. 9 and the reference data. As shown in FIG. 10, a correlation value calculated from the fractional-multiple-sampling data oversampled at the fractional multiple and the reference data interpolated by the fractional multiple in the enlarged manner also shows a high autocorrelation with the known symbol sequence. Thus, it can be understood that the reference timing of the known symbol sequence can be preferably detected.

In almost any case, circuits on the radio transmitter 120 side and the radio receiver 130 generally have phases shifted from each other. For this reason, the sampling point of the data sampled at a fractional-multiple rate does not necessarily match an original peak position. FIG. 4D is a graph obtained by enlarging a portion near the peak in the correlation data. As shown in FIG. 4D, it is conceivable that the original peak is located between sampling points. Hence, in this embodiment, the peak estimator 240 uses correlation values of multiple sampling points near the peak of the correlation data to estimate a shift amount of the original peak.

Generally, a waveform of a correlation value is a band-limited pulse waveform. Thus, by using a few points (for example, three points) around the sampling point at which the correlation data shows the maximum correlation value, a shift amount $t_{max}$ of an original peak can be estimated by use of the above-described interpolation formula. Meanwhile, when the waveform of the time response of the filter is viewed, a portion near the peak in the band-limited pulse waveform can be preferably approximated by a quadratic function. Thus, based on three points or more around the sampling point at which the correlation data shows the maximum correlation value, the shift amount $t_{max}$ of an original peak can be estimated by using the approximation. The estimated shift amount $t_{max}$ shows the start position and the sampling phase of the known symbol sequence.

In the approximation of the quadratic function, the approximation function is set as $F(t)=at^2+bt+c$. Then, coefficients a, b and c are obtained, the approximation function can pass through the three points near the peak, and thereby $t_{max}$ can be estimated as an extreme value ($=b/2a$) of the coefficients. Alternatively, $t_{max}$ can be estimated by curve fitting from a coefficient having the smallest square error. Since the thus obtained $t_{max}$ determines an interpolation ratio for the interpolation, correct data can be recovered from the data points around the sampling point.

When the reference timing is estimated, the converter 250 converts the fractional-multiple-sampling data into data having a symbol rate in accordance with the reference timing received from the peak estimator 240, and thus recovers the entire frame. The recovering act uses the interpolation formula used in generating the reference data. The integer p of q/p is a rational number since the value of the fractional multiple used for oversampling is preferably a small value in consideration of the complexity of the arithmetic operation, the efficiency of the arithmetic operation, and the power consumption for the recovering act. Since all the received frames are inputted to the converter 250, the overall performance can be improved by making the power consumption more efficient and the arithmetic operation of the recovering processing in the last stage using the interpolation formula.

Figure 5:
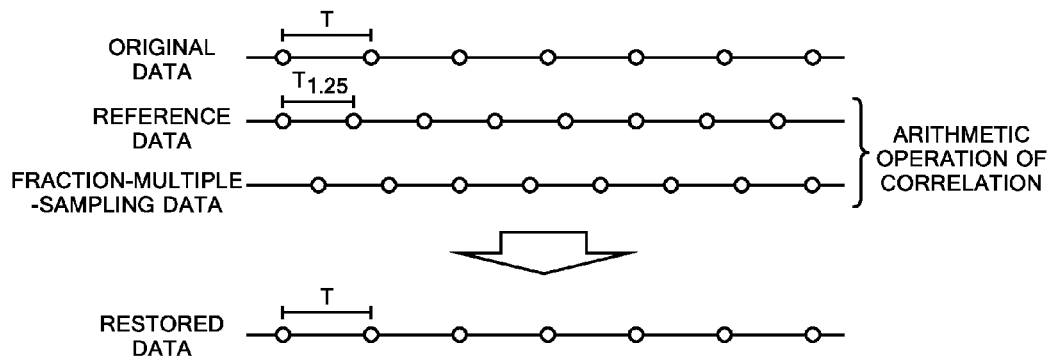
FIG. 5 is a diagram explaining a principle for recovering data having a symbol rate from fractional-multiple-sampling data of this embodiment.

FIG. 5 is a diagram explaining a principle in which the data having the symbol rate is recovered from the fractional-multiple-sampling data of this embodiment. As shown in FIG. 5, original data transmitted from the radio transmitter 120 is data having the symbol rate frequency T. The reference data is prepared so that the start position of the known symbol sequence included in the original data can be detected. The actually measured fractional-multiple-sampling data generally has a shifted phase relative to the original data, and is measured in a state where the start position of the data is unclear. However, by calculating the correlation with the reference data, the start position of the known symbol sequence and the sampling phase difference are evaluated. Then, the data having the original symbol rate is recovered from the fractional-multiple-sampling data in accordance with the evaluated reference timing.

Figure 6:
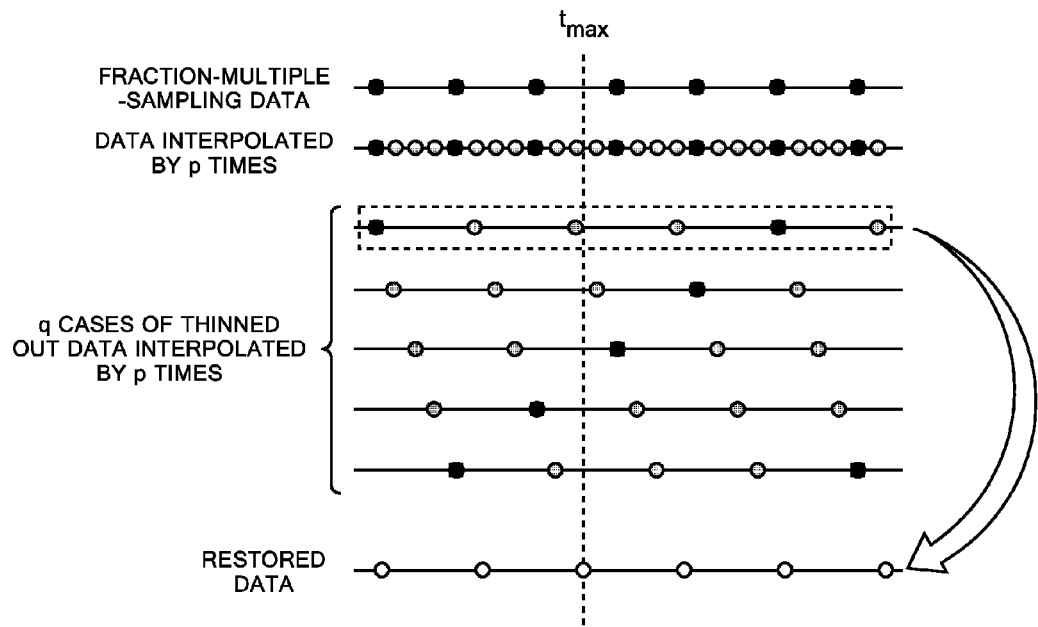
FIG. 6 is a diagram explaining in detail a principle for recovering data having a symbol rate from fractional-multiple-sampling data of this embodiment.

FIG. 6 is a diagram explaining the details of the principle for recovering the data having the symbol rate from the fractional-multiple-sampling data of this embodiment. In the recovering processing, the fractional-multiple-sampling data oversampled by q/p times is firstly interpolated by the integer multiple p by using the interpolation formula, so that data interpolated by p times is generated. The interpolation formula is the same as the aforementioned one used in generating the reference data.

As shown in FIG. 6, there are q cases of how the data interpolated by p times is thinned out every q which is an integer to have the original symbol rate. Preferably, a sequence having a sampling point closest to a peak position of the shift amount $t_{max}$ is selected from among the q types of sequences, and then the selected sequence is interpolated at an interpolation ratio obtained from the shift amount $t_{max}$ by using the above-described interpolation formula. Thereby, the data having the symbol rate can be recovered. Thereafter, by using the interpolation ratio described above, similar processing is performed on the fractional-multiple-sampling data corresponding to the entire frame including the payload 154 following the preamble 152. Thereby, a bit sequence of the entire frame can be recovered. As described above, when the oversampling by q/p times is adopted, since the sequence having the original symbol rate is recovered by interpolating the data by p times, a smaller integer p results in a smaller number of cases and thus smaller load on the arithmetic operation.

According to the aforementioned embodiment of the present invention, the known symbol sequence is detected after the degree of the matching of the waveform between the reference data and the actual measurement is evaluated, the reference data obtained by interpolating the known symbol sequence in the enlarged manner at the fractional-multiple rate with respect to the symbol rate by reflecting the overall filter characteristic of the transmitter and the receiver. Thereby, instead of oversampling at an integer multiple, the reference timing in data transmitted from the transmitter can be preferably identified and thus symbol synchronization can be achieved.

In addition, according to the aforementioned embodiment, simply performing a correlation calculation on the reference data and the sampling data which have the fractional-multiple rate substantially leads to a result including an overall filter characteristic of the transmitter and the receiver and an over-sampling characteristic. This can avoid such extra processing that causes an additional error, and thus achieves highly accurate synchronization. Furthermore, the data length of the reference data used for the correlation calculation can be made shorter than in a conventional case in which a register having a data length of an integer multiple needs to be secured. This can preferably avoid a larger circuit configuration and increase of power consumption.

In the aforementioned embodiment, the description has been given in which the value of crosscorrelation between the reference data and the fractional-multiple-sampling data is calculated and the reference timing is obtained from the peak position of the crosscorrelation value. However, a pattern matching method can be adopted instead of the correlation calculation in another embodiment. In this case, a pattern matching processor is configured instead of the correlation calculator 230. The pattern matching processor calculates an evaluation value indicating the degree of the matching of the waveform between the reference data and the fractional-multiple-sampling data. The peak estimator 240 estimates a timing at which the matching becomes the largest from the evaluation data outputted from the pattern matching processor.

The radio receiver according to the embodiment of the present invention is not restricted by the specifications of the radio transmitter which is the communication counterpart. As long as the filter characteristic of the radio transmitter is known, the overall filter characteristic can be obtained together with the filter characteristic of the receiver. Thus, the reference data can be provided according to the thus obtained overall filter characteristic.

As described above, the embodiment of the present invention can provide a radio receiver, a radio communication system, a radio communication method, and a program which can achieve symbol synchronization with sufficient accuracy even in high-speed radio communications in which a band of a signal and a band of a circuit are close to each other, and thus oversampling at a rate of an integer multiple is difficult.

The aforementioned function of the present invention can be implemented as a device-executable program written in a legacy programming language or an object oriented programming language such as an assembler, C, C++, Java (registered trademark of Sun Microsystems), Java (registered trademark of Sun Microsystems) Beans, Java (registered trademark of Sun Microsystems) Applet, Java (registered trademark of Sun Microsystems) Script, Perl, or Ruby. The program can be distributed by being stored in any device-readable recording medium or distributed by being transmitted through a network.

Although having been described above by using the specific embodiment, the present invention is not limited to the embodiment, but can be changed within a range in which those skilled in the art can come up with by implementing another embodiment, or by adding, changing, or omitting any element of the present invention. Any modes thus made should be included within the scope of the present invention, as long as these modes provide the same operations and advantageous effects as those of the present invention.

What is claimed is:

1. A non-transitory computer readable storage medium comprising a computer readable program for radio communication executed by a radio receiver configured to communicate with a radio transmitter which transmits data with a known symbol sequence arranged in a frame, wherein the computer readable program when executed on a computer causes the computer to perform the steps of:

sampling a baseband signal transmitted from said radio transmitter at a fractional multiple of a symbol rate, wherein fractional-multiple-sampling data is generated;

performing an arithmetic operation for evaluation data in which the degree of consistency in waveform between said fractional-multiple-sampling data and reference data is evaluated, said reference data being obtained by interpolating said known symbol sequence at said rate of said fractional multiple, wherein said interpolation reflects an overall filter characteristic of said radio transmitter and said radio receiver;

estimating a reference timing from a shift amount at which said evaluation data shows a maximum degree of consistency in waveform; and converting said fractional-multiple-sampling data by using said reference timing as a reference wherein said frame having said symbol rate is recovered.

2. The computer readable storage medium according to claim 1, wherein a value of said fractional multiple is a rational number larger than 1 but smaller than 2.

3. The computer readable storage medium according to claim 2, further comprising: referring said reference data generated beforehand by interpolating said known symbol sequence at said rate of said fractional multiple by using a filtering function which expresses said filter characteristic.

4. The computer readable storage medium according to claim 3, further comprising: performing an arithmetic operation for the evaluation of data between said fractional-multiple-sampling data and said reference data by a method selected from the group consisting of a calculation of correlation and pattern matching processing.

* * * * *